June 30, 1970    J. L. PECZKOWSKI ET AL    3,517,506

FUEL CONTROL GOVERNOR

Filed Oct. 25, 1967    3 Sheets-Sheet 1

INVENTORS
JOSEPH L. PECZKOWSKI
FRANCIS G. SOLLMAN
BY
ATTORNEY

INVENTORS
JOSEPH L. PECZKOWSKI
FRANCIS G. SOLLMAN
BY
M. A. Hobbs
ATTORNEY

INVENTORS
JOSEPH L. PECZKOWSKI
FRANCIS G. SOLLMAN
BY
M. A. Hobbs
ATTORNEY

# United States Patent Office 3,517,506
Patented June 30, 1970

3,517,506
FUEL CONTROL GOVERNOR
Joseph L. Peczkowski, and Francis G. Sollman, South Bend, Ind., assignors to The Bendix Corporation, a corporation of Delaware
Filed Oct. 25, 1967, Ser. No. 678,002
Int. Cl. F02c 9/02; F16d 3/14; G01p 3/18
U.S. Cl. 60—39.16
12 Claims

ABSTRACT OF THE DISCLOSURE

A governor for a free turbine engine for driving the rotor of a helicopter in which a coil spring is interposed between the main governor shaft and the weight assembly for eliminating or minimizing torsional instability of the drive shaft between the free turbine and the helicopter rotor. The spring means is adjustable to permit the correlation of the torsional resonance frequency of the governor with the torsional resonance frequency of the turbine and rotor.

---

A free turbine engine with which the present invention is used basically consists of a generator section which includes a compressor, a combustion section and a turbine for driving the compressor, and a power takeoff section which includes an independently rotatably power absorbing turbine referred to herein as a "free or power turbine," coupled to a drive shaft for providing a usable shaft output. In an installation on a helicopter, the free turbine is connected by a power train to the rotor which under normal operating conditions is maintained at a substantially constant speed. In the application of free turbine engines to helicopters, the power train from the free turbine to the rotor is essentially a direct drive, normally including a drive shaft from the turbine to a gear box and a main drive shaft connecting the gear box and the rotor, and the free turbine is controlled by a governor which regulates the gas generator to maintain the required or desired rotor speed. In this system, the natural torsional frequency of the rotor and the power turbine is excited by the fuel control system causing torisonal instability, in which the power train and the main drive shaft in particular tend to oscillate at the natural frequency of the turbine and rotor combination. This torsional instability is primarily in response to and/or is amplified by variations in the power output of the gas generator as determined by the control governor. The basic dynamic problem of the power turbine governor is to control the basic loop as quickly as possible without exciting the natural torsional frequency of the rotor and power turbine and/or to filter out or cancel the torsional resonance and reduce the magnitude of the oscillations of the power train resulting from changes in the operation of the control governor. The aforementioned torsional instability, which is primarily an oscillating motion between the two extremes, causes vibration and roughness in the operation of the rotor and reduces the life of the rotor, gears, and bearings, and results in premature failure of the rotor and power train. It is therefore one of the principal objects of the invention to provide a control governor having a mechanism incorporated therein which has the effect of controlling the magnitude of the power oscillations by canceling or filtering out the torsional instability fed into the governor so that it does not have any appreciable effect on the operation of the governor in controlling the gas generator.

Another object of the invention is to provide a relatively simple and compact automatic fuel control governor for free turbine engines, which contains a mechanism for suppressing the effect of torsional instability of the power train on the operation of the governor and which can readily and precisely be adjusted to eliminate or minimize the adverse effect of the instability on the governor operation.

Still another object of the invention is to provide a governor of the aforementioned type having a mechanism for canceling the effect of torsional instability, which correlates the induced torsional frequency with the natural frequency of any particular rotor-turbine combination to obtain optimum operational performance in the governor and which is so constructed and designed that in the event of any malfunctioning of the mechanism, the governor is still capable of functioning to maintain the system in safe operating limits.

Additional objects and advantages of the invention will become apparent from the following description and accompanying drawings, wherein.

Figure 1:
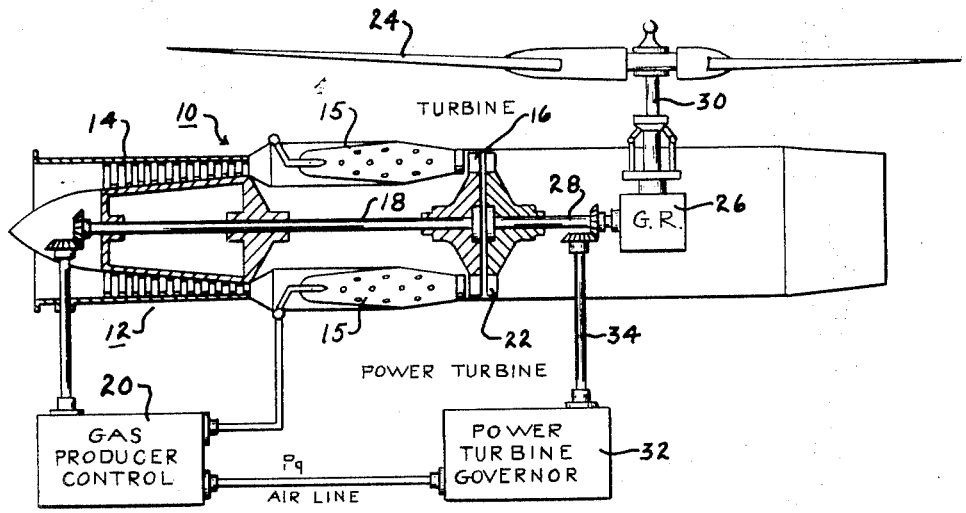
FIG. 1 is a schematic view of a free turbine engine embodying the present invention.
Figure 5:
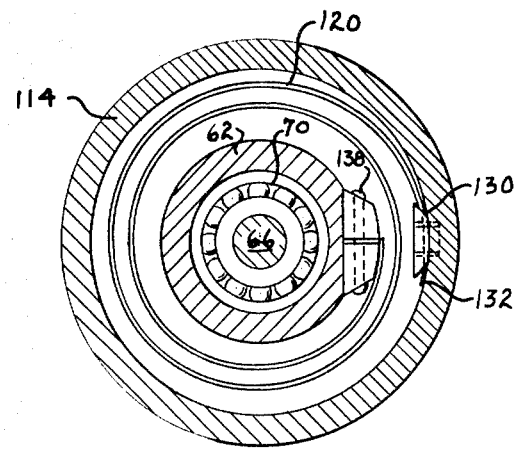
FIG. 5 is a horizontal cross sectional view of the present mechanism, the section being taken on line 5—5 of FIG. 4.

Referring more specifically to the drawings and to FIG. 1 in particular, numeral 10 designates generally a free turbine engine with which the present invention is used and which, for the purpose of the present description, may be considered conventional with the exception of the present invention embodied therein. Numeral 12 indicates the gas generator section having a compressor 14, burners 15 and a turbine 16 which drives the compressor through shaft 18. The control for the gas generator is indicated by numeral 20 and is of a type driven by a power train from shaft 18 interconnecting the compressor 14 and turbine 16. Control 20 is a well known type such as that shown and described in U.S. Pat. No. 3,152,444, and the construction and operation will not be described herein except as required for a full understanding of the present invention. The power turbine indicated by numeral 22 is connected to the rotor 24 of a helicopter by a power train generally consisting of a gear box 26, a shaft 28 connecting the power turbine 22 to the gear box, and the main drive shaft 30 connecting gear box 26 to rotor 24. The speed of the power turbine is controlled by a governor device 32 driven from shaft 28 by a power connection 34. The governor device controls a flapper valve, which in turn regulates control 20. The control device 32 embodying the present invention is designed to suppress or cancel torsional instability in the power train consisting of gear box 26 and shafts 28 and 30, as it controls the speed of power turbine 22, and hence the speed of rotor 24, by regulating the output of the gas generator.

The present power turbine governor device is shown in detail in FIGS. 2 through 5, and includes a housing 40 having a chamber 42 in which a drive assembly 44 and weight assembly 46 are rotatably mounted. The drive assembly includes a shaft 48 connected by gear 50 to a power takeoff driven from shaft 28 of power turbine 22, gear 50 being splined to the outer end of shaft 48 and rotatable therewith. The shaft is journalled in a bearing 52 in the wall of housing 40 and in a bearing 54 at the inner end of an internal annular wall 56 joined integrally with and forming a part of housing 40. The housing is sealed around shaft 48 by a sealed structure 58 secured to the end of the housing by a plurality of screws 60. The inner end of shaft 48 has an enlarged portion 62 with an axial bore 64 for receiving a drive shaft 66 of weight assembly 46, the drive shaft being journalled in the enlarged portion 62 in bearings 70 and 71. The two bearings permit free rotative motion between shaft 48 and shaft 66; however, during normal operation of the governor device, the two shafts merely oscillate relative to one another without making a complete revolution with respect to one another.

The fly weight assembly includes two fly weights 72 and 73 pivotedly mounted on fly weight table 74 by pins 76 and 77, respectively. The two fly weights contain inwardly extending legs 78 and 80 which engage the underside of axially movable sleeve 82 mounted on a shaft 84. Sleeve 82 moves axially on shaft 84 as the fly weights move outwardly and inwardly in response to the centrifugal force of the rotating weight assembly and move valve control lever 90 in various angular positions for controlling a flapper valve 92 in the side wall of housing 40. Valve 92 is controlled by valve element 94 rigidly connected to lever 90 and movable toward and away from valve 95 as lever 90 rotates or pivots on pivot pin 96. Lever 90 is provided with an arm 98 for engaging a shoe 100 mounted on the upper end of sleeve 82 and journalled on bearing 102 to permit free relative rotation between the sleeve 82 and shoe 100 as the weight assembly is rotated within housing 40. Lever 90 and valve element 94 are constantly urged in the valve closing direction by a spring 104 reacting between lever 90 and the throttle operated lever 106 pivotally mounted on a pin 108 seated in the wall of housing 40. The lever 106 is moved to various operating positions by a linkage (not shown) of conventional construction.

Figure 2:
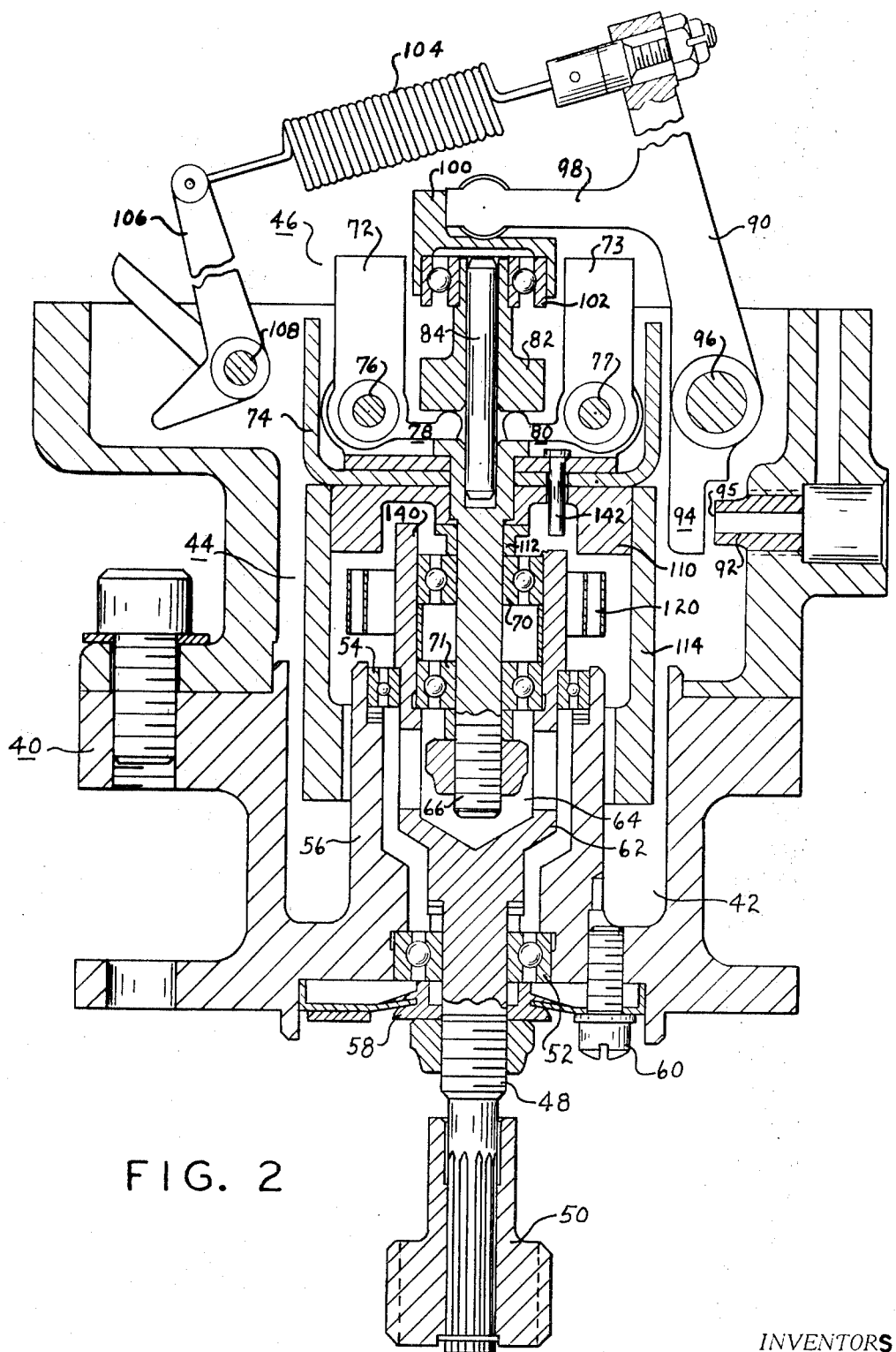
FIG. 2 is a cross sectional view of an automatic fuel control governor used on the engine shown in FIG. 1 and embodying the present invention.
Figure 3:
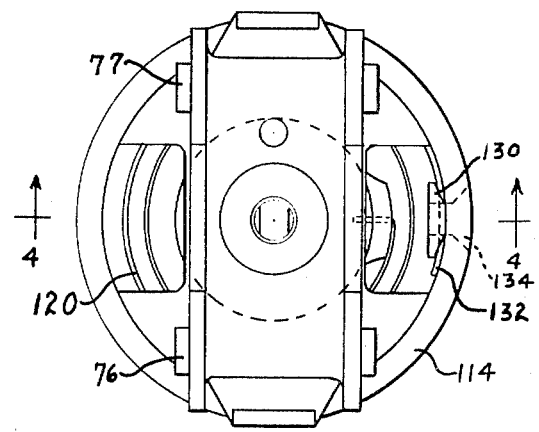
FIG. 3 is a top plan view of the fly weight assembly.
Figure 4:
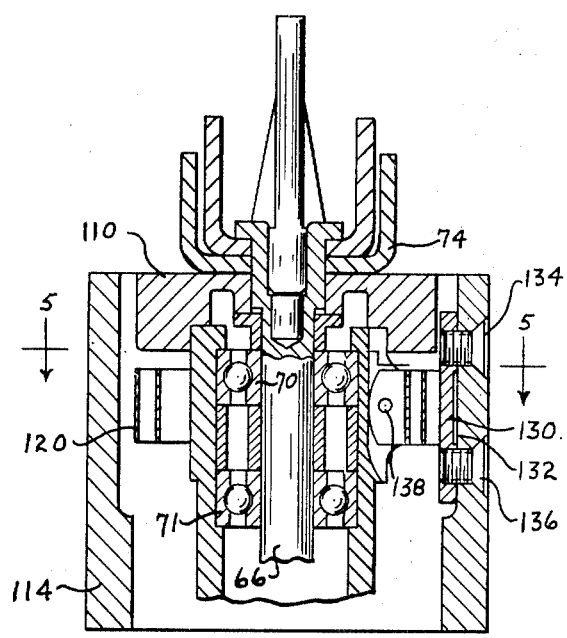
FIG. 4 is a vertical cross sectional view of the fly weight assembly shown in FIG. 3, the section being taken on line 4—4 of FIG. 3.

As the fly weights move outwardly in response to centrifugal force, legs 78 and 80 move sleeve 82 axially upwardly, which in turn moves shoe 100 upwardly and rotates lever 90 in a clockwise direction as viewed in FIG. 2, thereby moving valve element 94 away from valve 92, the degree of valve opening being determined by the setting of the throttle lever as transmitted by spring 104 to lever 90. Weight table 74 is mounted on a disc-shaped plate 110, which in turn is mounted on shaft 66 and held in place thereon by a bushing 112 seating on bearing 70 and supporting the underside of plate 110. A cylindrical sleeve 114 is connected to the periphery of plate 110 and extends downwardly in chamber 42 externally of enlarged shaft portion 62 and in spaced relation to the annular wall portion 56. The sleeve, plate, and weight table 74 form a rigid unit which rotates within chamber 42 along with shaft 66, and is adapted to oscillate relative to shaft 48.

Enlarged shaft portion 62 and sleeve 114 are operatively connected to one another by a coil leaf spring 120 connected at its inner end to the external wall of enlarged shaft portion 62 and at its outer end to the internal wall of sleeve 114 for transmitting a driving force from shaft 48 to weight assembly 46. In order to adjust the torsional resonance frequency of the spring to obtain a predetermined correlation between the torsional resonance frequency of a particular power turbine and rotor combination, an adjustment means is provided at the external end of spring 120, consisting of a bar 130 forming a clamp with the internal wall of sleeve 114 for adjustably securing end 132 of spring 120 to the sleeve. The bar is firmly tightened and held in place after an adjustment has been made by screws 134 and 136 extending through holes in sleeve 114 into threaded holes in bar 130. The inner end of spring 120 is secured to enlarged portion 62 of shaft 48 by a screw 138 or by any other suitable means. The spring 120 forms, in effect, a flexible coupling structure between shaft 48 and sleeve 114, which permits the sleeve 114 to move angularly with respect to shaft 48, but otherwise normally rotates the sleeve substantially in unison with shaft 48 to drive the weight assembly.

In order to provide a fail safe construction between drive shaft 48 and weight assembly 46, the upper end of enlarged portion 62 of shaft 48 contains a lug 140, and the weight assembly contains a pin 142 which extends downwardly from weight table 74 through plate 110 into position for engagement with lug 140. In the event spring 120 should fail, the lug 140 will engage pin 142 and transmit the rotating force of shaft 48 to weight assembly 46, and thus afford continued operation of the governor until it is possible to make appropriate repairs on the governor by the replacement or adjustment of spring 120. The lug and pin normally do not engage one another, and hence the fail safe structure remains inoperable throughout the normal operation of the governor.

In the operation of the governor embodying the present invention, with the engine operating, the speed of free turbine 22 is transmitted through power train 34 to gear 50 and shaft 48. As shaft 48 rotates, the force thereof is transmitted through enlarged portion 62 and spring 120 to sleeve 114, which in turn drives plate 110 and weight table 74. As the weight table rotates, the centrifugal force applied to weights 72 and 73 causes the weights to swing outwardly and the inner ends of legs 78 and 80 to move upwardly. With the movement of the two legs 78 and 80 upwardly, sleeve 82 is moved axially on shaft 84, moving shoe 100 upwardly and thereby causing lever 90 and valve element 94 to move angularly in a clockwise direction, thus opening valve 92 and repositioning valve element 94 relative to valve seat 95 to reduce the power output of the gas generator. In the event the turbine 22 should decrease in speed, the centrifugal weights move inwardly, thus permitting spring 104 to move lever 90 and valve element 94 in a counterclockwise direction to close or restrict valve 92 and thereby cause control 20 to increase the power output of the gas generator, which thereby increases the speed of turbine 22 and hence increases the speed of rotor 24.

Any torsional oscillation or instability of shafts 28 and 30 imposed on natural torsional frequency of turbine 22 and rotor 24, by variations in the speed of governor 32, is minimized by spring 120, which has a predetermined torsional frequency selected by adjusting the position of end 132 of the spring in clamp 130. The torsional oscillatory frequency of the spring can be varied by making the proper adjustment of the spring to counteract or suppress any desired torsional characteristic in the power train, thereby virtually eliminating any detrimental torsional instability in the power train. The spring 120 may be of different shapes or types, and other types of means for adjusting the torsional resonance frequency of the spring may be used.

The present governor mechanism may be embodied in other types of jet engines of turbine engine controls and may be used in other applications such as in power trains with drive shafts having an inherent resiliency for driving an inertial load. While only one embodiment of the present mechanism has been described in detail herein, various changes may be made.

We claim:

1. A governor device for controlling the speed of a free turbine engine for driving the rotor of a helicopter having a power train with an inherent torsional resonance frequency: said device comprising a control element for regulating the power output of the engine, a main shaft for connection with said power train, a rotatable governor weight assembly, a linkage operated by said governor assembly and connecting said assembly to said control element, a spring means coupling said main shaft to said weight assembly, and means for tuning the torsional resonance frequency of said spring means to the torsional resonance frequency of the power train for minimizing the torsional instability in said power train.

2. A governor device as defined in claim 1 in which a mechanical structure positively interconnects said shaft and said weight assembly in the event said spring means fails.

3. A governor device as defined in claim 1 in which said drive shaft has an enlarged inner end with an axial bore therein, and said weight assembly has a shaft journalled in said bore and being mounted for angular movement relative to said shaft.

4. A governor device as defined in claim 3 in which said weight assembly includes a weight table, and a sleeve extending from said weight table in axial alignment with said shaft and to a point directly transverse to the enlarged inner end of said shaft, and in which said spring means is connected at one end to the inner end of said shaft and at the other end to said sleeve.

5. A governor device as defined in claim 4 in which said spring means is a coil spring secured at one end to the inner end of said shaft and at the other end to said sleeve.

6. A governor device as defined in claim 5 in which said means for adjusting said spring consists of a clamp-like structure mounted on said sleeve and the adjustment of said spring is made by sliding the respective end of said spring longitudinally in said clamp-like means.

7. A governor device as defined in claim 4 in which a mechanical structure positively interconnects said shaft and said weight assembly in the event said spring means fails.

8. A governor device as defined in claim 7 in which said structure consists of interengaging members on the inner end of said shaft and on said weight assembly.

9. A governor device as defined in claim 1 in which said spring means is a coil spring secured at one end to the inner end of said shaft and at the other end to said weight assembly.

10. A governor device as defined in claim 9 in which said means for adjusting said spring changes the effective length of said spring.

11. A governor device as defined in claim 10 in which said means for adjusting said spring is mounted on said weight assembly.

12. A governor device as defined in claim 10 in which said means for adjusting said spring consists of a clamp-like structure for releasably holding one end of said spring in various adjusted positions.

References Cited

UNITED STATES PATENTS

| | | | |
|---|---|---|---|
| 2,991,618 | 7/1961 | Marscher | 60—39.28 |
| 96,225 | 10/1869 | Hafner. | |
| 1,087,818 | 2/1914 | Osborne | 73—526 |
| 1,127,154 | 2/1915 | Andersen et al. | |
| 3,309,868 | 3/1967 | Downing et al. | 170—135.74 |
| 1,535,639 | 4/1925 | Weber. | |

MARK M. NEWMAN, Primary Examiner

U.S. Cl. X.R.

60—39.28; 64—15, 27; 73—526, 535; 170—135.74